United States Patent Office 3,313,616
Patented Apr. 11, 1967

3,313,616
PURIFICATION OF COPPER POWDER
Melvin E. Tuvell, 3657 St. Bernard,
St. Ann, Mo. 63074
No Drawing. Filed May 26, 1965, Ser. No. 459,100
5 Claims. (Cl. 75—.5)

This invention relates to the production of non-ferrous metal powders and more particularly it deals with the purification of copper powder which has been produced by hydrometallurgical, pyrometallurgical, or electrolytic deposition processes. More specifically, it is concerned with the decarbonization of copper particles to yield a relatively or substantially pure copper powder.

Over the past 50 years, with the increasing utilization of such nonferrous metals as copper, zinc, nickel, cobalt, cadmium, and the like, particularly copper, there has steadily grown a demand for an improved procedure whereby such metals can be more efficiently recovered from their ores. Particularly throughout the latter part of this period, many attempts have been made to devise processes for carrying out purely chemical operations. Some of these chemical processes or operations, which are generally known in the art as hydrometallurgical production or processes, are described in the following U.S. Patents: 2,647,825, 2,734,821, 2,767,081, 2,767,082, 2,814,564, 2,853,380, and 3,127,264. These patents are merely exemplary and are not limitive or exhaustive and are set forth herein merely to show the wide variety of hydrometallurgical processes for producing copper particles which can then be treated by the novel processes of the present invention.

In U.S. 2,734,821, issued Feb. 14, 1956, the patentee therein describes a method for the recovery of elemental metal powder from salt solutions. The original source of the solution of metal values may be from any or all of (1) sulfide ores or concentrates which have been leached by various known methods, including such ancillary steps as roasting and/or blending; (2) oxidized ores, metal bearing precipitates, a crude metal, dross, speiss, or slag which has been leached; or (3) spent plating solution, pickling solutions or other waste or by-product solutions, resulting from some other and nonmaterial operation. A "clarified" solution, containing a dissolved salt of the desired metal, is then adjusted to optimum hydrogen ion concentration and dissolved material contents, and then subjected to increased temperatures, usually above the boiling point and under pressure, and in the presence of a suitable reducing gas; the solution is thoroughly agitated during the process as a preferred mode of operation. The same (reducing) conditions are then maintained until the reaction is sufficiently complete, at which time the precipitated product is collected, washed, dried, and either used or shipped. The residual solution and/or washings are variously recovered and recycled. In such process, the reducing gas is usually sulphur-free and the metals, which have an oxidation-reduction potential between that of cadmium and silver in the electromotive force series of the elements and which are capable of forming, with ammonia in aqueous solution, a complex cation, can be precipitated by this method as metal powder substantially free from impurities.

U.S. Patent 2,734,821 is another patent in the hydrometallurgical field in conjunction with the production of nonferrous metals. In U.S. Patents 2,767,081 and 2,767,082, there are described therein the use of inorganic and organic catalytic nucleation promoters which are added to the solution which is undergoing reduction in order to enhance the precipitation of the metal contained in said solution.

In U.S. 2,814,564, there is described a process for the production of wrought metal articles wherein the copper, nickel, or cobalt are recovered in wrought form from an impure raw material containing such metal, by dissolving such metal from the raw material in an aqueous leach solution, then introducing hydrogen reducing gas into said solution at an elevated temperature and pressure to precipitate the metal in substantially pure pulverulent form, rolling the precipitate into a consolidated bar form while in its freshly reduced state and then working the consolidated bar into a wrought shape.

In U.S. 2,853,380, there is described the addition of surface active agents (e.g. acrylic and polyacrylic acids, lignin and derivatives of lignin) to the solution being reduced which results in the reduction of surface activity of the individual metal particles as they precipitate from said solution to the extent that the formation of a metallic bond between the individual particles is substantially inhibited. The over-all result of the addition of surface active agents to the solution results in the fact that the agglomeration of metal particles and their plastering on the walls of the reaction vessel are substantially minimized and the physical characteristics of the product metal powder are substantially improved.

In U.S. Patent 3,127,264, issued Mar. 31, 1964, there is described a hydrometallurgical method of separating impurities, such as lead and tin, from a solution which also contains dissolved values of at least one other nonferrous metal which are to be recovered from the solution substantially free from impurities. The method set forth and described in this patent entails the addition of Celestite or strontium sulfate to an ammoniacal ammonium carbonate solution which contains dissolved copper and the subsequent agitation of the solution to thereby precipitate the impurity, that is lead or tin, from said solution. The solution, after being separated from the precipitated impurities, is then reduced with hydrogen gas at elevated temperatures and pressure to precipitate the copper as product metal in finely divided state and substantially free from impurities.

The general hydrometallurgical process for the production of substantially pure metallic copper is summarized in the following description. Notwithstanding the fact that substantially pure metallic copper may be produced from copper bearing ores, one other means of obtaining substantially pure copper is from copper bearing scrap material such as refrigeration coil, automobile radiators, etc. The copper bearing scrap material may be pretreated, if desired, in a variety of ways in order to remove the impure materials from the nonferrous metals. An example of this pretreatment is the burning of insulating material from old copper wiring.

The scrap material or pretreated copper is then placed in a large tank and a leaching solution which is generally an ammoniacal ammonium carbonate solution is fed into said tank or is already contained therein and the copper bearing scrap material lowered into said solution. The leaching solution is then agitated by various means in order to insure sufficient liquid-solid contact between the scrap material and the solution. During this leaching step, air is fed into the leaching solution which is at a temperature of from about 90° F. to 130° F. in order to maintain the ratio of cuprous to cupric ions in the solution in the range of from about 2 to 1 to about 4 to 1. During this leaching operation, the copper from the scrap material is extracted and/or dissolved in the leaching solution which is then referred to in the art as the "pregnant" solution. The next step entails the separation of the copper bearing solution or "pregnant" solution from the residue or insoluble material remaining in the tank. In some instances, in order to insure the removal of other nonferrous metals from the pregnant solution, strontium sulfate is added to the pregnant solution as described in the aforementioned U.S. Patent 3,127,264. With the addition of the strontium sulfate and the thorough agitation of the solution containing said sulfate, nonferrous metals such as lead and tin are precipitated from the pregnant solution.

The pregnant solution is then separated from the nonferrous precipitated residue and the "purified" solution is then transferred to an autoclave wherein the purified copper bearing solution or "pregnant" solution is reduced by injecting hydrogen gas thereinto. Organic surface active agents (e.g. polyacrylic acids as disclosed in U.S. 2,853,380) may be added to the solution being reduced in order to prevent wall plastering and increase the rate of copper particle precipitation. This reduction step brings about the precipitation of discrete copper particles which are then separated by various means, i.e., filtration, centrifugation, decantation, etc. The freshly precipitated copper particles may then be either used in the wet state or they can be dried to a powdered product containing less than 1 to 2% by weight moisture prior to any additional treatment. The wet copper particles or the dry copper powder thereafter usually undergoes further processing steps, specifically sintering whereby the copper material is reduced to substantially pure metallic copper of various shapes.

One of the common goals of the processes as set forth in the aforementioned patents and/or the general hydrometallurgical process for the production of copper powder is the production of pure copper powder containing only minute quantities of impurities which do not adversely affect the copper powder in conjunction with the desired intended use of said powder. One of the impurities retained in the copper powder is carbon which is undesirable for many end uses of copper powder. Specifically, the carbon interferes in the making of copper strip or tubing because it tends to prevent the copper particles from adhering to each other with the result that "tears" are formed, "blisters" are produced, and the electrical conductivity of the copper strip or tube is adversely affected. In the process for producing copper powder from copper bearing scrap material, it has been ascertained and/or discovered that carbon as an impurity enters the hydrometallurgical process from one or all of three separate sources: (1) the organic material which is present in the scrap material per se (e.g. the oil in refrigeration coils), (2) the organic material present in the ammonium carbonate leaching solution which has been previously produced by the hydrogen reduction step and (3) the organic surface active agents (contained in the pregnant solutions being reduced) such as those described in U.S. Patent 2,853,380. The carbon impurity problem has not been recognized in the prior art nor has a solution been presented thereto.

Accordingly, it is one of the objects of the present invention to provide an improved method for purifying copper powder.

Another object of the present invention is to provide a method for purifying copper powder containing carbon impurities prior to rolling the powder into consolidated tubing, bar, or strip form while in its freshly reduced state.

Another object of the present invention is to provide an improved hydrometallurgical process whereby copper powder containing carbon impurities is decarbonized prior to undergoing the step of sintering or further heat treating processes.

Other objects of this novel process will become apparent from the subsequent description of the invention and the appended claims.

The novel concept of the present invention resides in the discovery that the oxidation by controlled heating of copper powder, containing carbon impurities, in air (or other oxygen containing gases such as oxygen, hydrogen peroxide, etc.) will effectively and substantially reduce the amount of carbon in said copper powder to such an extent that the treated copper powder is highly acceptable for subsequent treatment thereto to produce, inter alia, copper tubing or strip of high quality. The improvement in results obtained by the practice of the present nivention is markedly advantageous. As previously set forth, the solution to the carbon impurity problem has not ben resolved herttofore by the art. However, in certain of the processes as described in the aforementioned patents, partial oxidation may have inherently been carried out by aging (i.e., standing or placing in atmospheric conditions prior to subsequent treatment) the freshly precipitated copper powder; but if such were in fact the case, such procedure is ineffective, cumbersome and very time consuming. The novel and improved process of the present invention provides an efficient, thorough, and a very highly effective means for the decarbonization of copper powder prior to being sintered or undergoing other processing steps.

The copper powder to be treated by the novel process of the present invention may be prepared by any one of the processes as described heretofore. The hydrometallurgical processes as described in the aforementioned patents are merely exemplary and are not considered exhausting or limiting. Furthermore and in order to avoid the enlargement of the present specification, the processes described in said patents as set forth above are considered as incorporated herein by reference.

While the present invention relates and/or is directed to the purification, i.e. decarbonization of copper particles or powder produced from copper-bearing ores, nonferrous metals coated with copper, and mixtures thereof can be treated with the novel process of the present invention; and all of these metals are considered within the scope of this invention.

In essence, the novel process of the present invention comprises an oxidation step (subsequent to the generally known process for producing copper from copper ores or scrap material) whereby wet or dry copper powder containing carbon or carbon-containing impurities is heated at a temperature in excess of 400° F. but below the sintering temperature (which is about 1,200° F. for copper), preferably between 700 and 800° F., in the presence of an oxidizing medium such as air or other oxygen containing gas which it is believed converts the carbon to carbon monoxide or carbon dioxide. Such oxidation step may also effect a conversion of from about 10 to about 30% of the copper to copper oxide. However, the copper oxide formed therefrom is subsequently reduced (generally by hydrogen gas) to metallic copper in a sintering step. By this over-all process, most of the carbon contained in the powder is oxidized (in the oxidation step) and removed as a gas, probably as the monoxide or dioxide. It was also unexpectedly discovered that the oxidation step also decreases the quantity of "fines" present after the sintering step, thereby providing a means for controlling the particle size distribution and powder density of the metallic copper. The amount of carbon or carbon compounds present in the freshly precipitated copper powder is usually from about .06 to about .15% by weight on a dry copper weight basis, i.e. having less than 1–2% moisture. For commercial acceptance, copper powder should not contain more than 0.02% maximum by weight of carbon as an impurity in the copper powder.

The particle size of the copper powders being oxidized vary to some extent. Specifically the particle size may range from about 1 to about 500 microns. However, it is preferred that the particle size be within the range of from about 10 to about 100 microns. It is to be noted that if large size particles, i.e. greater than 100 microns, are utilized in the novel process of the present invention, the solid-gas contact may be somewhat ineffective. It is to be noted further that if the oxidation process of the present invention is to be effectively carried out whereby the carbon is oxidized, it is necessary that the copper powder particle size be sufficiently small. Furthermore, if the novel process of the present invention is to be conducted on a continuous basis, i.e. the material is being oxidized while being conveyed on an endless conveyer, it is necessary that the depth of the bed be sufficiently small in order to promote effective solid-gas contact.

In one embodiment of the present invention, the process of decarbonization of copper powder comprises the steps of heating the such powder to a temperature in excess of 400° F. but below the sintering temperature thereof and while maintaining said temperature, contacting said powder with an oxygen containing gas for a sufficient time in order to oxidize the carbon therein and effect the removal of said carbon therefrom.

In another embodiment of the present invention, the process of decarbonization of copper powder selected from the group consisting of copper, and copper coated nonferrous metal powders, which nonferrous metal has been produced by a hydrometallurgical process and wherein organic surface active agents are utilized, comprises the steps of heating copper powder which has a moisture content of less than 2% to a temperature of from about 400° F. to about 1,200° F., preferably from about 700 to about 800° F., and while maintaining this temperature, contacting said heated copper powder with an oxidizing gas, preferably air, for approximately about 5 to about 60 minutes whereby the copper powder is substantially decarbonized.

It will be noted that air is the preferred oxidizing gas in the aforementioned embodiment. Air is less expensive and readily available whereas other oxygen containing gases, such as oxygen, hydrogen peroxide, etc., present economic and handling problems.

Tht novel process of the present invention is best exemplified by the following description or examples, and these examples are merely exemplary and not considered limitive.

EXAMPLE I

The general test procedure used for the decarbonization of copper powder is set forth in the subsequent description. Several 200-gram samples of copper powder (which contained 0.027% carbon on a weight basis and which were prepared in a similar manner as described in the aforementioned patents and general process) were oxidized by heating said samples at different temperatures in a bench-top rotary kiln through which air was passed at a rate of 10 cubic feet per hour. The kiln was inserted into a preheated muffle furnace controlled at the desired temperature.

The data set forth in Table 1 show the residual carbon content in the oxidized copper powder versus the temperature of the said powder. The over-all results of the data illustrate the effect of temperature on the degree of oxidation. Dry copper powder (i.e. containing less than 1–2% moisture) was obtained by drying wet powder at a temperature of about 250° F. for 30 minutes. After the samples were oxidized at the designated temperatures (i.e. 100–400° C.), they were then converted to the metallic copper form by hydrogen reduction. The metallic copper powder containing the residue carbon was then analyzed for residual carbon by well-known combustion analyses procedures. The original or untreated copper powder contained approximately 0.027% carbon and due to the oxidation of the dry copper powder at 400° C. (752° F.), the residual carbon was only .011% in the final or treated copper samples.

The particle size of the copper powder being oxidized may vary somewhat. Of course, if large particles (greater than 100 microns) are present, the solid-gas contact may be somewhat ineffective. The particle size of the copper powder utilized in the present samples was as follows:

| U.S. Tyler Screen Mesh: | Percent by weight |
|---|---|
| +100 | .1 |
| −100+150 | 7.6 |
| −150+200 | 14.9 |
| −200+270 | 13.8 |
| −270+325 | 17.4 |
| −325 | 46.0 |

The results of Example I are set forth in the following Table I.

*Table I—Effect of oxidation on dry copper powder*

| Calcining temperature (½ hour): | Percent carbon in sample |
|---|---|
| No treatment | 0.027 |
| 100° C. (212° F.) | 0.027 |
| 200° C. (392° F.) | 0.023 |
| 300° C. (572° F.) | 0.018 |
| 400° C. (752° F.) | 0.011 |

Example II

In order to ascertain the effectiveness of the oxidation treatment on high carbon percentages in copper powder, a second series of tests were run. The carbon content in this series of copper contained 0.089% by weight carbon as compared to the 0.027% by weight carbon in the copper powder treated in the first series of tests. This series of tests also differed from the first series of tests in that the samples were unreduced, that is the hydrogen reduction treatment after oxidation was not carried out on the copper samples. The residual carbon in the various oxidized (predried) copper samples, each indicated a different oxidizing temperature, were analyzed in a similar manner as described in Example I. These results are set forth in Table II which follows:

*Table II.—Oxidation of dry copper powder containing .089% carbon*

| Temperature of treatment (½ hour): | Percent residual carbon in oxidized sample |
|---|---|
| 100° C. (212° F.) | 0.089 |
| 200° C. (392° F.) | 0.055 |
| 300° C. (572° F.) | 0.043 |
| 400° C. (752° F.) | 0.018 |

The data presented in the above Table II readily points out that the carbon is removed in the oxidation step and a further reduction step by hydrogen is not necessary to remove the carbon. As previously mentioned, the second series of tests were conducted under similar conditions and at similar temperatures as the first series of tests, i.e. Example I, on the copper powder. The period of oxidation was approximately 30 minutes and at 4 different levels of temperatures at which the copper powder was maintained for said period. As can readily be seen from the aforementioned data, the oxidation temperature of approximately 400° C. or 752° F. renders a reduction in carbon of the carbon sample from .085% to approximately .018%.

In order to ascertain the effect of prolonged heating of copper powder, additional copper samples containing .089% carbon, were oxidized over different time periods, i.e. ½ hour, 1 hour, 2 hours, 3 hours, and 4 hours at 300° C. (572° F.). The data obtained from this test disclosed that the decarbonization took place during the first 30 minutes and the additional time for heating an oxidation had no significant effect in the further reduction of the carbon impurity in the sample.

The extent of oxidation is directly dependent upon the temperature as is shown in the above examples. It was noted that decarbonization depended upon the temperature of oxidation and was not significantly effected by prolonged periods of time, i.e. greater than 1 hour, at the specific temperature. From the tests it was determined that an optimum temperature of approximately 750° F. for the heated copper powder in an air atmosphere was required to lower the carbon content to below 0.02% starting with a carbon content of approximately 0.08% or lower. However, powder containing higher percentages of carbon can be treated or decarbonized by the novel process of the present invention. While the period of oxidation was determined to be at an optimum of about 30 minutes, an oxidation period of from about 5 to about 60 minutes is considered within the scope of the present invention. While the tests heretofore described were carried out batchwise in a bench-top rotary kiln, it is also within the scope of the present invention to conduct the oxidation step in a continuous process.

It is also within the scope of the present invention to provide an oxidation temperature in the range of from about 400° C. (752° F.) to as high as 1,000° C. (1,832° F.) in order to effectively remove the carbon impurities in nonferrous metals below the desired level of 0.020%. However, it is critical that these oxidation temperatures do not exceed the sintering temperature because the degree of decarbonization of the nonferrous metallic powders would be greatly reduced.

It will be understood, of course, that modifications can be made in the preferred embodiment of the method described herein without departing from the scope of the invention as defined by the appended claims.

What is claimed is:

1. In a process for the decarbonization of copper powder containing carbon impurities and which has been produced by a hydrometallurgical process wherein organic surface active agents were utilized during the reduction step, the improvement comprising the steps of heating said metallic powder to a temperature in excess of 400° F. but below the sintering temperature thereof, and while maintaining said temperature, contacting said metallic powder with an oxidizing gas for from about 5 to about 60 minutes whereby the carbon impurity therein is oxidized and substantially removed therefrom and whereby such oxidation subsequently promotes, after sintering of said powder, a reduction in the quantities of fines in the copper powder.

2. In a process for recovering a copper metal in the form of discrete powder from an aqueous ammoniacal ammonium carbonate solution, containing at least one dissolved salt of at least one such metal and containing an organic surface active agent, by treating said solution with a reducing gas at a superatmospheric pressure and an elevated temperature, the improvement in combination therewith of reducing the carbon content of the powdered metal which comprises heating said powdered metal to a temperature in excess of 400° F. but below the sintering temperature thereof, and while maintaining said temperature, contacting said powdered metal with an oxidizing gas for a sufficient time in order to oxidize the carbon therein whereby substantial amounts of said carbon are removed from said powdered metal prior to sintering thereof.

3. The process of claim 2 wherein the temperature is from about 700° F. to about 800° F., and the oxidizing gas is air.

4. A process for the production of substantially pure copper powder from copper bearing scrap metal which comprises the steps of leaching copper bearing scrap material with an ammoniacal ammonium carbonate solution whereby copper is extracted from the copper bearing material into said solution; feeding air into the leaching solution during the leaching step whereby the ratio of cuprous to cupric ions in the solution is maintained from about 2 to 1 to about 4 to 1; separating the copper bearing solution from the residue material; purifying the copper bearing solution by adding strontium sulfate thereto whereby the other nonferrous metals contained in said solution are substantially precipitated therefrom; separating the purified copper bearing solution from the nonferrous precipitated residue; adding an organic surface active agent to said solution in order to promote the subsequent precipitation of copper particles; reducing the purified copper bearing solution by contacting with hydrogen gas; separating the precipitated copper powder from said solution; drying the freshly precipitated copper powder to a moisture content of from about 1 to about 2% by weight; heating the dried copper particles to a temperature in excess of 400° F. but below the sintering temperature thereof and while maintaining said temperature contacting said copper particles with an oxidizing gas for a sufficient time in order to substantially decarbonize the copper powder and remove most of the carbon therefrom; sintering said substantially decarbonized copper powder in the presence of hydrogen to reduce the copper oxide content thereof to substantially pure metallic copper.

5. The process of claim 4, wherein the ammoniacal ammonium carbonate solution is at a temperature of from about 90° F. to about 130° F.; the heating temperature of the dried copper particles is from about 700° F. to 800° F., the contact time is from about 5 to about 60 minutes, and the oxidizing gas is air.

References Cited by the Examiner
UNITED STATES PATENTS 2,170,158   8/1939   Rennerfelt _____ 75—28
2,813,020   11/1957  Van Hare _____ 75—117

DAVID L. RECK, *Primary Examiner.*

W. W. STALLARD, *Assistant Examiner.*

UNITED STATES PATENT OFFICE
CERTIFICATE OF CORRECTION

Patent No. 3,313,616                                        April 11, 1967

Melvin E. Tuvell

It is hereby certified that error appears in the above numbered patent requiring correction and that the said Letters Patent should read as corrected below.

In the heading to the printed specification, lines 3 and 4, for "Melvin E. Tuvell, 3657 St. Bernard, St. Ann, Mo. 63074" read -- Melvin E. Tuvell, St. Ann, Mo., assignor to Monsanto Company, St. Louis, Mo., a corporation of Delaware --.

Signed and sealed this 14th day of November 1967.

(SEAL)
Attest:

Edward M. Fletcher, Jr.                                      EDWARD J. BRENNER

Attesting Officer                                              Commissioner of Patents